June 17, 1952  O. MESSERSCHMIDT  2,600,902

INSULATING HANDLE

Filed July 7, 1949

INVENTOR.
Otto Messerschmidt
BY Walter S. Alston

ATTORNEY.

Patented June 17, 1952

2,600,902

UNITED STATES PATENT OFFICE 2,600,902

INSULATING HANDLE

Otto Messerschmidt, Goettingen, Germany, assignor to Aluminiumwerke Goettingen G. m. b. H., Goettingen, Germany, a corporation of Germany Application July 7, 1949, Serial No. 103,383
In France September 2, 1948

1 Claim. (Cl. 16—119)

The invention relates to insulating handles of the type having a metal flange adapted to be secured to a cooking vessel or other container by welding.

The heat protection covers of handles of this type mostly are made of synthetic plastics which are responsive to higher temperatures. Therefore, the danger exists that the heat protection cover may be damaged or even destroyed when fastening the handle, by the heat of the welding torch conducted from the flange through the metal stem or shaft of the handle to the insulating cover in the welding operation.

It is the object of the present invention to provide a design of a handle by which said difficulty can be avoided.

Another object of the invention is to provide a design of a handle which can be produced easily and cheaply.

With this object in view, according to the present invention the flange of the insulating handle is formed as a separate part adapted to be separately welded to the container. In order to ensure a safe connection between the metal core or shaft of the handle provided with the insulation and the flange already welded to the container, the flange is provided with connecting means cooperating with suitable counter-connecting means at the ends of the handle shaft. For instance, the flange may be provided with sleeve-shaped projections with internal thread adapted for threadable engagement with externally threaded sleeves which are rotatably secured on the shaft ends of the U-shaped handle.

Further objects and features of the invention will be seen from the following detailed description in connection with the accompanying drawing, showing by way of example and purely schematically one embodiment of the invention and in which.

Similar reference numerals denote similar parts in the different views.

Figure 1:
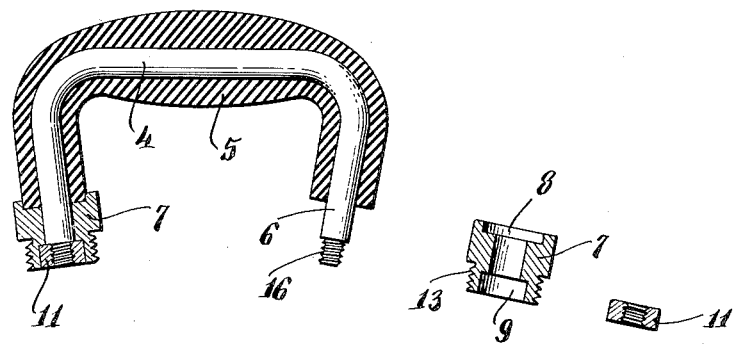
Fig. 1 is a sectional view of the parts of the handle before their assemblage.
Figure 2:
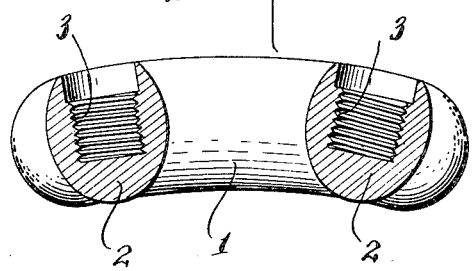
Fig. 2 is a side view of the handle in its finished form.
Figure 2:
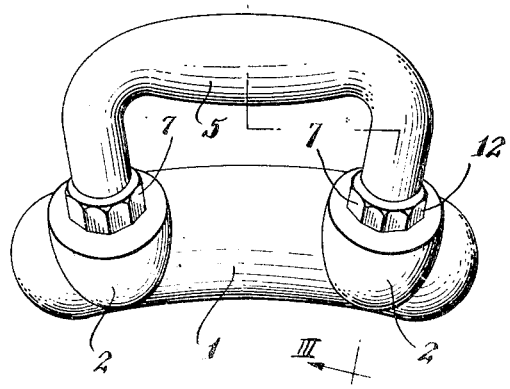
Figure 3:
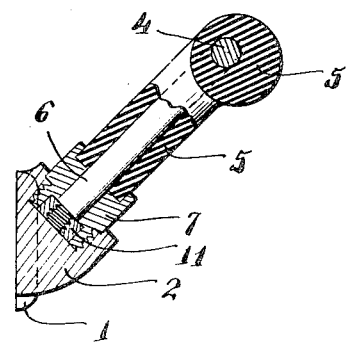
Fig. 3 is a cross section through the handle, on line III—III in Fig. 2.

Referring now to the drawings in greater detail, it will be seen that the insulating handle includes a flange 1 made as a separate casting, preferably of aluminium, which is adapted to be secured to the outer wall of a cooking vessel or other container by welding. This flange has two sleeve-shaped projections 2 provided with female thread 3.

The real handle consists of a U-shaped metal core or shaft 4 of aluminium with a heat insulating cover 5 of a suitable insulating material pressed around the shaft. The ends of the handle shaft 4 project from the heat protecting cover, forming bearing journals 6 for sleeves 7 rotatably mounted thereon. Said sleeves may also consist of aluminium and their cylindrical recesses 8 and 9 provided at the two faces of each sleeve are held between the shoulder or collar formed by the end of the insulating cover 5 on the one hand and the steel nut 11 screwed on the reduced shaft end 10 on the other hand. The sleeves 7 have each a polygonal head 12 and a portion 13 stepped from said head and provided with external thread adapted to be screwed into the internal thread 3 of the sleeve-shaped projections 2 of the flanges.

By the design of the insulating handle in accordance with the present invention it is rendered possible at first to weld the flange of the handle to the pot or vessel and then to connect the insulated U-shaped handle in a reliable manner with the fixed flange. Moreover, the handle meets with all requirements regarding mechanical strength in practical use of the handle. A further advantage lies in the simple and cheap manufacture and assemblage of the insulating handle.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

An insulating handle comprising a substantially U-shaped handle shaft of metal, with screw-threaded ends, an insulating cover around the grip portions of said shaft and part of the shaft legs so as to leave leg portions exposed between said threadings and said cover, a nut on each of said threadings, and a sleeve rotatably mounted on each of said exposed leg portions, each sleeve including a head portion and a foot portion, said head portion being formed for the application of a torque and being provided with a first inner recess in which the adjacent end of said cover is received, said foot portion being provided with a second inner recess in which the associated one of said nuts is received to retain said sleeve without substantially projecting therefrom, said foot portion being exteriorly threaded so as to be adapted to be screwed into an interior threading provided on a vessel for which the handle is destined.

OTTO MESSERSCHMIDT.

REFERENCES CITED

The following references are of record in the file of this patent:

UNITED STATES PATENTS

| Number | Name | Date |
|---|---|---|
| 1,486,425 | Gibson | Mar. 11, 1924 |
| 2,057,096 | Haber | Oct. 13, 1936 |

FOREIGN PATENTS

| Number | Country | Date |
|---|---|---|
| 274,460 | Italy | May 21, 1930 |
| 339,036 | Italy | Apr. 14, 1936 |
| 590,258 | France | Mar. 12, 1925 |
| 611,676 | France | Oct. 8, 1926 |